July 28, 1959     S. D. WILTSE     2,897,005
FLUIDIZED PRESSURE SYSTEM
Filed March 11, 1957
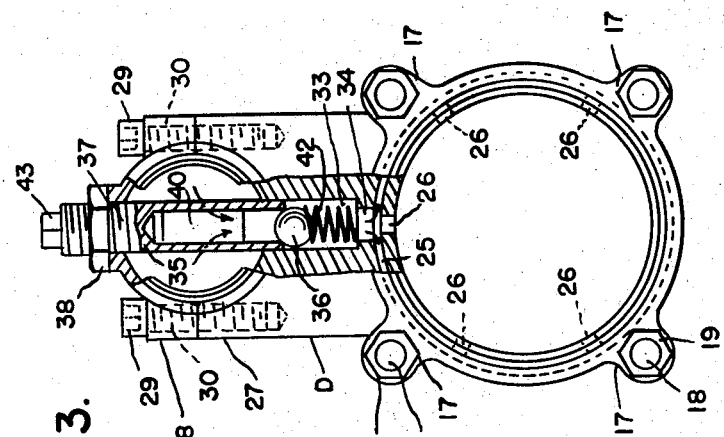
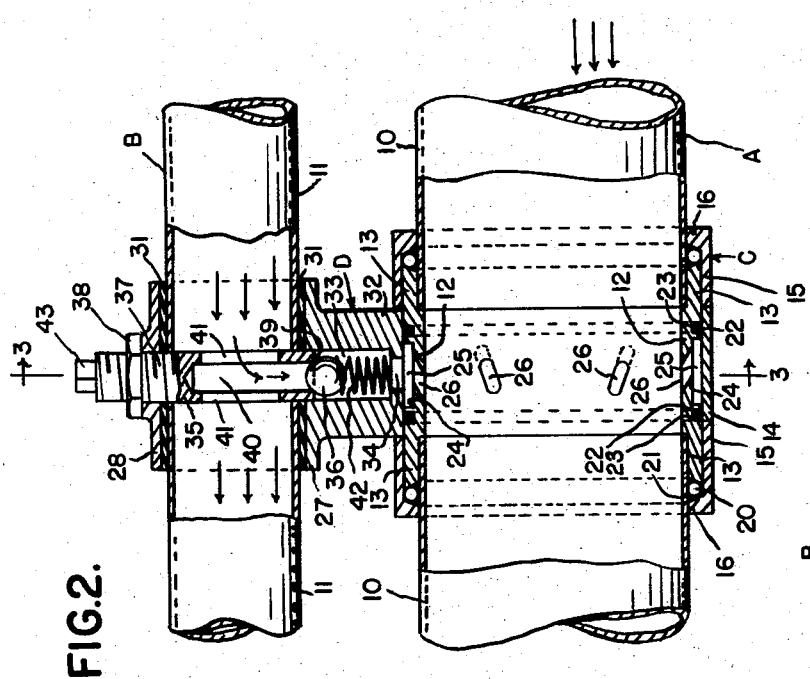
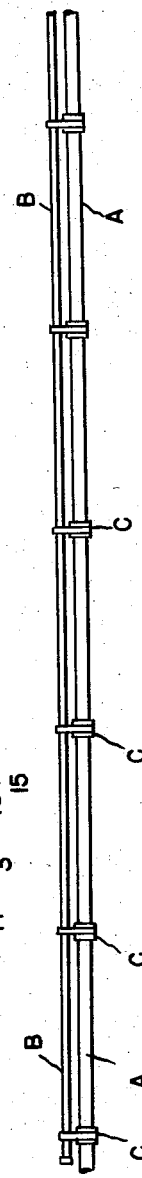
INVENTOR.
SUMNER D. WILTSE
BY
*Whittemore, Hulbert & Belknap*
ATTORNEYS

United States Patent Office 2,897,005
Patented July 28, 1959

2,897,005

FLUIDIZED PRESSURE SYSTEM

Sumner D. Wiltse, Detroit, Mich.

Application March 11, 1957, Serial No. 645,117

10 Claims. (Cl. 302—24)

This invention relates generally to a fluidized pressure system, and refers more particularly to a system wherein a medium such as air or gas or any other suitable fluid under pressure is utilized to convey one or more materials, such as flour or any other material or combination of materials composed of particles through a conduit or the like.

Heretofore both the conveying medium and the material conveyed thereby were contained within a single conduit of considerable length and oftentimes the pressure of the conveying medium dropped and was insufficient to convey further the material being conveyed. When the pressure dropped, the velocity also dropped and then no provision was made for conveying the material further in the conduit to its required destination.

Therefore, it is an object of the present invention to overcome the difficulties encountered during the use of the single conduit system mentioned by providing an improved fluidized pressure system wherein two conduits, preferably arranged parallel to each other are employed, one being preferably larger in diameter than the other and constituting a main conduit through which a material composed of particles is conveyed, and the other being an auxiliary conduit through which a fluid under pressure travels, and wherein the main and auxiliary conduits mentioned are interconnected at predetermined points longitudinally thereof by adjustable control means whereby the fluid under pressure in the auxiliary conduit may be admitted as needed or desired to the main conduit at such points to be mixed with and serve as a booster for the material to be conveyed to facilitate and assure its continued travel or movement through the main conduit.

Another object is to provide a system wherein the pressure of the booster fluid admitted at predetermined points to the main conduit from the auxiliary conduit is sufficient to maintain the proper velocity in the main conduit, and the velocity is sufficient to convey the material composed of particles throughout the length of the main conduit to its required destination.

Another object is to provide a system wherein the inlets to the main conduit for the fluid under pressure from the auxiliary conduit are preferably located at circumferentially spaced points of the main conduit and are inclined relative to the axis of the main conduit so that the fluid under pressure admitted to the main conduit will be directed by said inlets in a circular whirling vortex and thereby will build up pressure to maintain the velocity needed to convey the material composed of particles through the main conduit as aforesaid.

Another object is to provide a system that is simple in construction, economical in manufacture and efficient in operation.

Other objects, advantages and novel details of construction of this invention will be made more apparent as this description proceeds, especially when considered in connection with the accompanying drawing, wherein:

Figure 1 is a fragmentary elevational view of a system embodying my invention;

Figure 2 is an enlarged vertical sectional view through one of the connections between the two conduits of the system and showing parts broken away and in section;

Figure 3 is a sectional view taken substantially on the line 3—3 of Figure 2.

Referring now to the drawing, A is the main conduit, B is the auxiliary conduit and C are the adjustably controlled connections between the said conduits at predetermined spaced points lengthwise thereof.

As shown, the main conduit A comprises a series of longitudinally aligned tubes 10 of predetermined uniform diameter. The auxiliary conduit B comprises a series of longitudinally aligned smaller tubes 11 of uniform diameter. Each of the connections C comprises a tubular spacer 12 disposed between and abutting adjacent ends of the tubes 10 and provided at its opposite ends with outwardly offset tubular extensions 13 that are sleeved upon the adjacent tubes 10, a fitting D having a tubular portion 14 sleeved upon the spacer 12, coupling rings 15 sleeved upon the tubular extensions 13 in abutting relation with opposite sides of the tubular portion 14 of the fitting D and provided beyond and in spaced relation to the tubular extensions 13 with inturned portions or flanges 16 that are sleeved upon and embrace adjacent tubes 10, laterally projecting flanges 17 on the coupling rings 15, bolts 18 extending between and through said flanges 17, and nuts 19 threadedly engaging said bolts and maintaining the parts in assembled relation.

Preferably the inside diameter of the spacer 12 is the same as the inside diameter of the tubes 10, so that the passage between adjacent tubes 10 is uninterrupted. Sealing rings 20 and gaskets 21 encircle the tube 10 between the tubular extensions 13 and the inturned flanges 16, and additional sealing rings 22 are disposed in longitudinally spaced circumferentially extending relatively narrow grooves 23 in the spacer 12 for engagement with the tubular portion 14 of the fitting D to seal the assembly against leakage. The spacer 12 is also provided between the grooves 23 with a relatively wide circumferentially extending groove 24 that cooperates with the encircling tubular portion 14 of the fitting D to form an annular passage 25, and is provided at circumferentially spaced points in communication with said annular passage 25 with inclined passages 26 that open into and constitute inlet ports for the main conduit A.

The fitting D extends radially from the main conduit A and encircles the auxiliary conduit B. Preferably this fitting D has two semi-circular portions 27 and 28 that embrace opposite sides of adjacent tubes 11 of the auxiliary conduit B and that are held in tight abutting relation by suitable bolts 29 extending freely through suitable holes 30 in the semi-circular cap portion 28 and threadedly engage the semi-circular body portion 27. A grommet or gasket 31 of rubber or other suitable sealing material encircles adjacent ends of the tubes 11 within the semi-circular portions 27 and 28 to provide a fluid tight joint between the parts. The semi-circular body portion 27 and the tubular portion 14 of the fitting D are integrally connected by an intermediate radially extending neck portion 32 containing a longitudinally extending passage 33 that is connected at its inner end by an opening 34 in the tubular portion 14 to the annular passage 25 aforesaid. Projecting diametrically of the auxiliary conduit B between and serving as a spacer for adjacent tubes 11 thereof is a manually operable or adjustable substantially cylindrical member 35 for a spring loaded or actuated ball valve 36 within the passage 33 to control the supply or flow of fluid under pressure from the auxiliary conduit B to the main conduit A. As shown, this member 35 has at its outer end a portion 37 that threadedly engages the semi-circular cap portion 28 and that is engaged upon the outer side of said cap portion by a lock-nut 38, and has its inner end within and engaging the walls of the passage 33 upon the outer side of and forming a seat 39 for the ball valve 36.

Extending axially of the member 35 is a passage 40 that opens into the passage 33, and disposed at diametrically opposite sides of the passage 40 are two aligned slots 41 that extend longitudinally of said member 35 substantially axially of the auxiliary conduit B and establish communication between the interior of said auxiliary conduit B and the passage 40.

The spring 42 for the ball valve 36 is within the passage 33 between the inner end thereof and the ball valve and normally holds the ball valve 36 against its seat 39 to close the passage 40 from the passage 33.

The outer end 43 of the member 35 is polygonal in shape so that it may be engaged by a wrench or other suitable tool (not shown) when it is desired to rotate or turn the member 35 to vary the tension of the spring 42 against the ball valve 36 and its seat 39. The locknut may be adjusted on the member 35 relative to the semi-circular portion 28 to maintain the desired adjusted position of the member 35.

In use, the inlet end of the main conduit A initially receives under pressure from a suitable source (not shown) fluidized material, such as a mixture of fluid under pressure and one or more materials composed of particles, while the inlet end of the auxiliary conduit B receives from a separate suitable source (not shown) fluid under pressure. The fluid under pressure in each instance is the conveying medium and may be air, gas or any other suitable fluid. The material composed of particles is the conveyed medium and may be flour or any other material or combination of materials composed of particles.

The tension of the springs 42 for the ball valve 36 at the predetermined longitudinally spaced points or connections C between said conduits A and B may be individually adjusted by the rotatable members 35 as desired to control the booster supply or flow of fluid under pressure from the auxiliary conduit B to the fluidized material under pressure in the main conduit A to facilitate its continued passage throughout the length of the main conduit. Such booster supply introduces pressure where needed to maintain the necessary pressure and velocity to continue the movement of the conveyed material in the main conduit A. In this connection, it is necessary to have sufficient pressure to maintain velocity, and it is necessary to have sufficient velocity to convey the material. This is accomplished by the booster fluid employed at the spaced connections C between the conduits A and B and such booster means is enhanced because the inlets 26 to the main conduit A for the fluid under pressure from the auxiliary conduit B are located at circumferentially spaced points of the main conduit A and are inclined relative to the axis of the main conduit A so that the fluid under pressure admitted to the main conduit will be directed by said inlets 26 in a circular whirling vortex and thereby will build up pressure to maintain the velocity needed to convey the material composed of particles through the main conduit.

If there are 15 pounds pressure per square inch in both the main conduit A and the auxiliary conduit B at one of the spaced connections C between said conduits A and B and the tension of the spring 42 for the ball valve 36 at such connection C had been set or adjusted accordingly by the adjustable control member 35 therefor, then no fluid under pressure would pass from the auxiliary conduit B to the main conduit A until the pressure in the main conduit A at such connection C dropped below 15 pound pressure, whereupon fluid under pressure would flow from the auxiliary conduit B past the ball valve 36 into the main conduit A.

However, if there are 15 pounds per square inch pressure in the main conduit A and there are 30–50 pounds per square inch pressure in the auxiliary conduit B, then assuming the tension of the springs 42 for the ball valves 36 at the spaced connections C had been adjusted properly, the ball valves 36 would automatically become unseated by the greater pressure from the auxiliary conduit B and thereby would permit the passage or flow of fluid under pressure from the auxiliary conduit B to the main conduit A at such spaced points C of interconnection between said conduits A and B where this relative pressure condition prevailed.

In the present instance, the tension of the spring 42 for the ball valve 36 at any of the spaced connections C between the conduits A and B may be varied as desired to control the opening and closing of the ball valve 36. Thus the rotatable member 35 at any of the spaced connections C between the conduits A and B may be readily turned or adjusted to vary the tension of the spring 42 for the ball valve 36 at such connection C to thereby vary the amount of fluid under pressure supplied by the auxiliary conduit B to the main conduit A. The locknut 38 may then be used to maintain the desired adjustment.

What I claim as my invention is:

1. In a system of the class described, a main conduit through which fluidized material under pressure may be conveyed, a separate auxiliary conduit through which a fluid under pressure may be conveyed, said main conduit comprising a series of longitudinally spaced tubes and tubular spacers between and anchored to adjacent ends of said tubes, the inside diameter of said spacers being substantially the same as the inside diameter of said tubes so that the passage between adjacent tubes is uninterrupted, said auxiliary conduit being spaced laterally from and substantially parallel to said main conduit, said auxiliary conduit comprising a series of longitudinally spaced tubes, fittings having portions embracing adjacent ends of the tubes of said auxiliary conduit and having tubular portions sleeved upon said tubular spacers, means for conducting fluid under pressure from said auxiliary conduit to said main conduit to serve as a booster for said fluidized material, including annular passages between said tubular spacers and the tubular portions of said fittings, passages in said fittings in communication with said annular passages in said tubular spacers, and passages inclining from said annular passages at diametrically spaced points thereof and opening into said main conduit in the direction of travel of fluidized material therein, and means controlling the supply of fluid under pressure from said auxiliary conduit to said main conduit including spring pressed valves in the passages in said fittings, and rotatable members between and serving as spacers for the adjacent ends of the tubes of said auxiliary conduit, said rotatable members threadedly engaging portions aforesaid of said fittings and having end portions within the passages in said fittings serving as seats for said spring pressed valves, said rotatable members having passages for admitting fluid under pressure from the interior of said auxiliary conduit to said valve seats and being accessible and adjustable from the exterior of said fittings to vary the tension of the valve springs to vary the action of said valves.

2. In a system of the class described, a pair of conduits arranged substantially parallel to each other, one containing both a material composed of particles to be conveyed and a fluid under pressure for conveying said material, the second conduit containing a fluid under pressure, fittings extending between and having end portions encircling said conduits at longitudinally spaced points thereof, said one conduit being provided within the end portions of the fittings encircling the same with circumferentially spaced inclined inlets for fluid under pressure, said fittings having passages for fluid under pressure in communication with said inlets, spring actuated valves in said passages, and elongated members extending diametrically of said second conduit within the end portions of the fittings encircling the same and having portions within and engaging the walls of the passages aforesaid and forming seats for said valves, said elongated members having means for admitting fluid under pressure from the second conduit to said passages subject to the action of said valves and being adjustable about their longitudinal axes to vary the tension of the springs for said valves.

3. In a system of the class described, a pair of conduits arranged substantially parallel to each other, one containing both a material composed of particles to be conveyed and a fluid under pressure for conveying said material, the second conduit containing a fluid under pressure, fittings extending between and having end portions encircling said conduits at longitudinally spaced points thereof, said one conduit being provided within the end portions of the fittings encircling the same with circumferentially spaced inclined inlets for fluid under pressure, said fittings having passages for fluid under pressure in communication with said inlet, spring actuated valves in said passages, and elongated members extending diametrically of said second conduit within the end portions of the fittings encircling the same and having portions within and engaging the walls of the passages aforesaid and forming seats for said valves, said elongated members having longitudinally extending passages opening into the passages aforesaid and having at diametrically opposite sides thereof substantially axially of said second conduit openings communicating with the interior of said second conduit and said longitudinally extending passages for admitting fluid under pressure from said second conduit to the passages in said fittings subject to the action of said valves, said elongated members threadedly engaging portions of said fittings so that said members may be adjusted about their longitudinal axes to vary the tension of the springs for said valves.

4. In a system of the class described, a pair of conduits, each having a pair of longitudinally spaced tubes, and a connection between said conduits for fluid under pressure, comprising a tubular spacer secured between adjacent ends of the tubes of one of said conduits, a fitting having a tubular portion sleeved upon said spacer, said spacer being provided with a circumferentially extending groove cooperating with the encircling tubular portion of the fitting to form an annular passage and provided at circumferentially spaced points in communication with said annular passage with inclined passages opening into and constituting inlet ports for said one conduit, said fitting having a second portion encircling adjacent ends of the tubes of the second conduit, the tubular portion and the encircling portion of said fitting being integrally connected by a radially extending portion containing a passage in communication with the annular passage aforesaid, a spring actuated valve in the second mentioned passage, and an elongated member extending diametrically of said second conduit between and serving as a spacer for adjacent ends of the tubes of the second conduit, said elongated member extending into and engaging the walls of said second mentioned passage and forming a seat for said valve, said member threadedly engaging the encircling portion of said fitting so that said member may be adjusted to vary the tension of the spring for said valve, said member having a longitudinally extending passage opening into the passage in said fitting and having an opening for admitting fluid under pressure from the second conduit to said longitudinally extending passage.

5. In a system of the class described, a pair of conduits, each having a pair of longitudinally spaced tubes, and a connection between said conduits for fluid under pressure, comprising a tubular spacer secured between adjacent ends of the tubes of one of said conduits, a fitting having a tubular portion sleeved upon said spacer, said spacer being provided with a circumferentially extending groove cooperating with the encircling tubular portion of the fitting to form an annular passage and provided at circumferentially spaced points in communication with said annular passage with inclined passages opening into and constituting inlet ports for said one conduit, said fitting having a second portion encircling adjacent ends of the tubes of the second conduit, the tubular portion and the encircling portion of said fitting being integrally connected by a radially extending portion containing a passage in communication with the annular passage aforesaid, a spring actuated valve in the second mentioned passage, and an elongated member extending diametrically of said second conduit between and serving as a spacer for adjacent ends of the tubes of the second conduit, said elongated member extending into and engaging the walls of said second mentioned passage and forming a seat for said valve, said member threadedly engaging the encircling portion of said fitting so that said member may be adjusted to vary the tension of the spring for said valve, said member having means for conducting fluid under pressure from the second conduit to the passage in said fitting subject to the action of said valve.

6. In a system of the class described, a main conduit through which a material composed of particles may be conveyed by a fluid under pressure, a separate auxiliary conduit outside said main conduit through which a fluid under pressure may be conveyed, said auxiliary conduit extending lengthwise of and substantially parallel to said main conduit, said main conduit comprising a series of longitudinally spaced tubes and tubular spacers between and anchored to said tubes at the adjacent ends thereof, the inside diameter of said spacers being substantially the same as the inside diameter of said tubes so that the passage between adjacent tubes is unaffected, said auxiliary conduit comprising a series of longitudinally spaced tubes, fittings having portions embracing adjacent ends of the tubes of said auxiliary conduit and having tubular portions sleeved upon said tubular spacers, means for conducting fluid under pressure from said auxiliary conduit to said main conduit to serve as a booster for said fluid under pressure in said main conduit, including annular passages between said tubular spacers and the tubular portions of said fittings, passages in said fittings in communication with said annular passages, and passages in said tubular spacers inclining from said annular passages at diametrically spaced points thereof and opening into said main conduit in the direction of travel of the material in said main conduit, spring pressed valve means within the passages in said fittings and responsive automatically to the pressure of fluid in one of said conduits for automatically regulating the transfer of fluid under pressure from said auxiliary conduit to said main conduit, and manually operable elongated means extending diametrically of said auxiliary conduit for varying the action of said automatically responsive means, said elongated means engaging said automatically responsive means and being between and serving as spacers for the adjacent ends of the tubes of said auxiliary conduit.

7. In a system of the class described, a main conduit through which a material composed of particles may be conveyed by a fluid under pressure, a separate auxiliary conduit outside said main conduit through which a fluid under pressure may be conveyed, said auxiliary conduit extending lengthwise of and substantially parallel to said main conduit, said main conduit comprising a series of longitudinally spaced tubes and tubular spacers between and anchored to said tubes at the adjacent ends thereof, the inside diameter of said spacers being substantially the same as the inside diameter of said tubes so that the passage between adjacent tubes is unaffected, said auxiliary conduit comprising a series of longitudinally spaced tubes, fittings having portions embracing adjacent ends of the tubes of said auxiliary conduit and having tubular portions sleeved upon said tubular spacers, means for conducting fluid under pressure from said auxiliary conduit to said main conduit to serve as a booster for said fluid under pressure in said main conduit, including annular passages between said tubular spacers and the tubular portions of said fittings, passages in said fittings in communication with said annular passages, and passages in said tubular spacers inclining from said annular passages at diametrically spaced points thereof and opening into said main conduit in the direction of travel of the material in said main conduit, and means controlling the supply of fluid under pressure from said auxiliary conduit to said main conduit including spring pressed valves in the passages in said fittings, and rotatable members between and serving as spacers for the adjacent ends of the tubes of said auxiliary conduit, said rotatable members adjustably engaging portions aforesaid of said fittings and having portions within the passages in said fittings serving as seats for said spring pressed valves.

8. In a system of the class described, a main conduit through which a material composed of particles may be conveyed by a fluid under pressure, a separate auxiliary conduit outside said main conduit through which a fluid under pressure may be conveyed, said auxiliary conduit extending lengthwise of and substantially parallel to said main conduit, connections between said conduits at longitudinally spaced points thereof including fittings having portions encircling said conduits, said main conduit being provided within the portions of the fittings encircling the same with annular passages for fluid under pressure and provided at circumferentially spaced points of said annular passages with passages communicating with said annular passages and opening into and constituting inlets for fluid under pressure to said main conduit, said fittings having passages for fluid under pressure in communication with said annular passages, said inlets being inclined relative to the axis of said main conduit in the direction of travel of the material in said main conduit, whereby the fluid under pressure from said inlets will serve as a booster for the fluid under pressure in said main conduit, spring pressed valve means within the passages in said fittings and responsive automatically to the pressure of fluid in one of said conduits for automatically regulating the transfer of fluid under pressure from said auxiliary conduit to said main conduit, and manually operable elongated members carried by said fittings and extending diametrically of said auxiliary conduit into the passages in said fitting for varying the action of said spring pressed valve means, the inner ends of said elongated members forming seats for said spring pressed valve means, and said elongated members having means for conducting fluid under pressure from said auxiliary conduit to the passages in said fittings subject to the action of said valve means.

9. In a system of the class described, a main conduit through which a material composed of particles may be conveyed by a fluid under pressure, a separate auxiliary conduit outside said main conduit through which a fluid under pressure may be conveyed, said auxiliary conduit extending lengthwise of and substantially parallel to said main conduit, connections between said conduits at longitudinally spaced points thereof including means for conducting fluid under pressure from said auxiliary conduit to said main conduit to serve as a booster for the fluid under pressure in said main conduit, spring pressed valve means within said conducting means and responsive automatically to the pressure of fluid in one of said conduits for automatically regulating the transfer of fluid under pressure from said auxiliary conduit to said main conduit, and manually operable means extending diametrically of said auxiliary conduit into said conducting means for varying the action of said automatically responsive means.

10. In a system of the class described, a main conduit through which a material composed of particles may be conveyed by a fluid under pressure, a separate auxiliary conduit outside said main conduit through which a fluid under pressure may be conveyed, said auxiliary conduit extending lengthwise of and substantially parallel to said main conduit, connections between said conduits at longitudinally spaced points thereof including fittings having portions encircling said conduits, said main conduit being provided within the portions of the fittings encircling the same with annular passages for fluid under pressure and provided at circumferentially spaced points of said annular passages with passages communicating with said annular passages and opening into and constituting inlets for fluid under pressure to said main conduit, said fittings having passages for fluid under pressure in communication with said annular passages, said inlets being inclined relative to the axis of said main conduit in the direction of travel of the material in said main conduit, whereby the fluid under pressure from said inlets will serve as a booster for the fluid under pressure in said main conduit, valve means within the passages in said fittings and responsive automatically to the pressure of fluid in one of said conduits for automatically regulating the transfer of fluid under pressure from said auxiliary conduit to said main conduit, and manually operable means carried by said fittings and extending diametrically of said auxiliary conduit into the passages in said fitting for varying the action of said spring pressed valve means, said manually operable means forming seats for said valve means.

References Cited in the file of this patent

UNITED STATES PATENTS

| | | |
|---|---|---|
| 857,096 | McCord | June 18, 1907 |
| 1,465,269 | Horn | Aug. 21, 1923 |
| 1,971,853 | Thiefeldt | Aug. 28, 1934 |
| 2,794,686 | Anselman | June 4, 1957 |

FOREIGN PATENTS

| | | |
|---|---|---|
| 120,053 | Sweden | Apr. 25, 1941 |